(12) United States Patent
Hayashi

(10) Patent No.: US 8,210,565 B2
(45) Date of Patent: Jul. 3, 2012

(54) AIRBAG COVER AND AIRBAG DEVICE

(75) Inventor: Naoya Hayashi, Suita (JP)

(73) Assignee: Ashimori Industry Co., Ltd., Osaka (JP)

( * ) Notice: Subject to any disclaimer, the term of this patent is extended or adjusted under 35 U.S.C. 154(b) by 0 days.

(21) Appl. No.: 12/993,606

(22) PCT Filed: May 12, 2009

(86) PCT No.: PCT/JP2009/058859
§ 371 (c)(1),
(2), (4) Date: Nov. 19, 2010

(87) PCT Pub. No.: WO2009/142128
PCT Pub. Date: Nov. 26, 2009

(65) Prior Publication Data
US 2011/0062688 A1 Mar. 17, 2011

(30) Foreign Application Priority Data
May 21, 2008 (JP) .................... 2008-133514

(51) Int. Cl.
*B60R 21/203* (2006.01)
(52) U.S. Cl. .................... 280/728.3; 280/731
(58) Field of Classification Search ........... 280/728.3, 280/731, 732; 74/552; 40/591, 593, 629
See application file for complete search history.

(56) References Cited

U.S. PATENT DOCUMENTS

| | | | | |
|---|---|---|---|---|
| 5,678,851 A | * | 10/1997 | Saito et al. | 280/728.3 |
| 5,851,022 A | * | 12/1998 | Yamamoto et al. | 280/728.3 |
| 6,443,484 B2 | * | 9/2002 | Anglsperger | 280/728.3 |
| 6,508,143 B2 | * | 1/2003 | Ibe et al. | 74/552 |
| 6,613,415 B2 | * | 9/2003 | Iida et al. | 428/139 |
| 7,097,199 B2 | * | 8/2006 | Dearden et al. | 280/728.3 |
| 7,921,563 B2 | * | 4/2011 | Doroghazi et al. | 29/897.15 |
| 2001/0002965 A1 | | 6/2001 | Ibe et al. | |

FOREIGN PATENT DOCUMENTS

| | | |
|---|---|---|
| GB | 2300159 A | 10/1996 |
| JP | 9-011833 A | 1/1997 |
| JP | 9-048315 A | 2/1997 |
| JP | 10-119683 A | 5/1998 |
| JP | 2001-225703 A | 8/2001 |

OTHER PUBLICATIONS

Supplementary European Search Report corresponding to European Patent Application No. 09750490.6, dated Oct. 28, 2011.

* cited by examiner

*Primary Examiner* — Joseph Rocca
(74) *Attorney, Agent, or Firm* — Sughrue Mion, PLLC (57) ABSTRACT

A decorative member can be readily attached to an airbag cover of an airbag device and attaching workability is enhanced. A decorative member 10 is attached to an attaching part 3 of an airbag cover 1, and engaging projections 13 of the decorative member 10 pass through through-holes in the airbag cover 1 to the back face 1B of the airbag cover 1. A holding member 20 is bent and pressed against the airbag cover 1 side, so that the engaging sections 21 are moved from a state where they are approached to each other between the engaging projections 13, to the direction in which the engaging sections 21 separate from each other. Consequently, the engaging sections 21 are inserted to engaging holes 13K to be engaged with the engaging projections 13. The holding member 20 allows the decorative member 10 to be attached to the airbag cover 1 through the engaging projections 13.

10 Claims, 4 Drawing Sheets

AIRBAG COVER AND AIRBAG DEVICE

TECHNICAL FIELD

The present invention relates to an airbag cover of an airbag device to installed in vehicles and, in particular, to an airbag cover having a decorative member and an airbag device including the airbag cover.

BACKGROUND ART

In order to protect passengers on a driving seat and a passenger seat in the event of a vehicle collision or emergency, cars having an airbag device including an inflatable and deployable airbag, for example, in a steering wheel or an instrumental panel are in widespread use. Since the airbag cover covering the airbag of the airbag device is usually installed, for example, at a front face or a sidewall facing a passenger in the interior of a car, it comes under passenger's observation. Accordingly, the airbag cover requires an ornamental design or decoration in addition to the passenger protecting function. So, until now, a decorative member having a decorative pattern such as logo or car's name is attached to the airbag cover to improve appearance with the decoration.

The airbag cover having such a decorative member must tightly hold the decorative member such that the decorative member does not drop off even if the airbag device is activated. For this reason, an airbag device having a decorative member having legs extending through a cover body (an airbag cover) to the back face where the legs are engaged to retainers of a catching part for tight attachment to the cover body is known (see Patent Document 1).

In such a conventional airbag device, an annular decorative member has a plurality of legs along the circumferential direction. A ring catching part having retainers of the respective legs is disposed on the back face of the cover body. After the legs are inserted into the respective retainers, the catching part is rotated along the circumferential direction to engage the legs to the retainers. In the airbag device, since the catching part, which includes an area for a plurality of legs arranged at the decorative member, must be rotatable, the size and shape of the catching part are limited. Consequently, the shape of the catching part is limited to be annular or discal. In parallel, since the size of the catching part is relatively large corresponding to the arrangement and number of the legs, a space for the arrangement of the catching part and a space for the engagement work tend to be larger. In addition, since the plurality of legs extends along the circumferential direction, the shape of the decorative member is limited to a circular form such as a ring or a disk, which impairs the degree of freedom of the design.

In the conventional airbag device, since the decorative member is fixed to the cover body by rotating the catching part in one direction to engage the retainers to the legs, a rotative force against the catching part in the opposite direction may cause the decorative member to disengage the decorative member from the cover. Furthermore, in order to compressively clip the cover body by the decorative member and the catching part after the decorative member is attached, the catching part is forced to be rotated while the decorative member is strongly pressed against to the cover body during the attaching work, which may cause a surface of the decorative member or the back face of the cover body to be damaged. In addition, the catching part should be rotated by a strong force with a special jig while the decorative member is pressed during the attaching work, resulting in difficulty in attachment with low workability.

Citation List
Patent Document
  Patent Document 1: Japanese Patent Laid-Open No. 09-11833

SUMMARY OF INVENTION

Technical Problem

The present invention has been made in view of the above-described conventional problem, and an object thereof is to readily attach a decorative member to an airbag cover of an airbag device and to enhance the workability of the attachment. Another object of the present invention is to securely attach and hold a decorative member to an airbag cover, and to increase the degree of freedom of the design on the shape of the decorative member.

Solution to Problem

The present invention provides an airbag cover having a decorative member, wherein the decorative member has at least two engaging projections facing each other on the airbag cover side and passing through through-holes in the airbag cover so as to project from the back face of the airbag cover and engaging holes disposed in the respective engaging projections on the back face side of the airbag cover; the airbag cover includes a holding member that has engaging sections engaged with the engaging projections by insertion to the engaging holes on the back face side of the airbag cover and holds the decorative member to the airbag cover by engagement of the engaging sections with engaging projections; and the holding member is deformed from a state where the engaging sections are approached to each other so as to separate the engaging sections to be inserted to the respective engaging holes. The present invention also provides an airbag device including the airbag cover.

ADVANTAGE OF THE INVENTION

According to the present invention, a decorative member can be readily attached to an airbag cover of an airbag device, and it is possible to enhance workability of the attachment. In addition, a decorative member can be securely attached and held to an airbag cover, and it is possible to increase the degree of freedom of the design on the shape of the decorative member.

DESCRIPTION OF EMBODIMENTS

An embodiment of the present invention is described below with reference to the drawings.

An airbag device according to the embodiment is an airbag device used for, for example, a driving seat, a passenger seat, or a side of a vehicle, and includes an airbag that can be inflated and deployed and an inflator that generates gas to be supplied to the airbag in the event of emergency or impact detection. The airbag device also includes an airbag cover having a decorative member attached on the front face. The folded airbag and the inflator are put in the airbag cover, and the airbag device is installed in a vehicle such that the vehicle interior side of the airbag is covered with the airbag cover.

Taking an airbag device to be mounted on a steering wheel of a vehicle as an example, an airbag cover having the decorative member is described below. Throughout the description of the airbag cover mounted to a vehicle, the back face refers to a face adjacent to the airbag and the front face refers to the opposite face adjacent to a passenger (the vehicle interior side).

Figure 1:
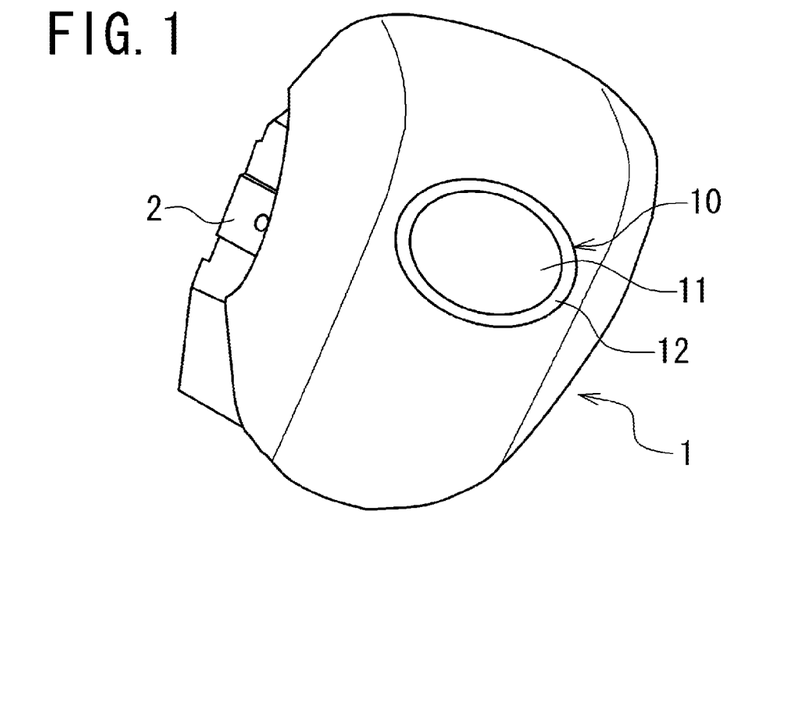
FIG. 1 is a perspective view of an airbag cover of an airbag device viewed from the front face according to an embodiment of the present invention.

FIG. 1 is a perspective view of an airbag cover of an airbag device viewed from the front face according to an embodiment of the present invention, schematically illustrating the overall configuration thereof.

An airbag cover 1 made of resin is formed into a substantially cup shape with a hollow back face having an integrally formed wall 2 projecting into a substantially tube shape. Through the wall 2, the airbag cover 1 is fixed to the steering wheel (not shown) with a fixing means. Accordingly, the airbag cover 1 (airbag device) is incorporated in the steering wheel and is disposed in the midsection such as between spokes connecting a circular rim (steering) and a central boss. An airbag is housed in an interior portion on the back face side of the airbag cover 1 that has grooved tear lines (not shown) at predetermined positions on the back face. When the airbag is inflated and deployed, the airbag cover tears along the tear lines by the inflating force to inflate and deploy the airbag ahead of the steering wheel.

Furthermore, a decorative member 10 having decoration on the front face side is attached and held to a predetermined position of the airbag cover 1 with a holding member (not shown), which is described below, disposed on the back face of the airbag cover 1. The decorative member 10 includes an substantially ellipsoidal ornament 11, and an substantially annular ornament ring 12 retaining the ornament 11 to a hole in the center. The ornament 11 is decorated with a logo, an ornamental pattern, surface finishing for decoration, and so forth. On the back face of the ornament ring 12, engaging projections engaged and held by a holding member for the attachment to the airbag cover 1 and locking members locked to the airbag cover 1 are disposed.

Figure 2:
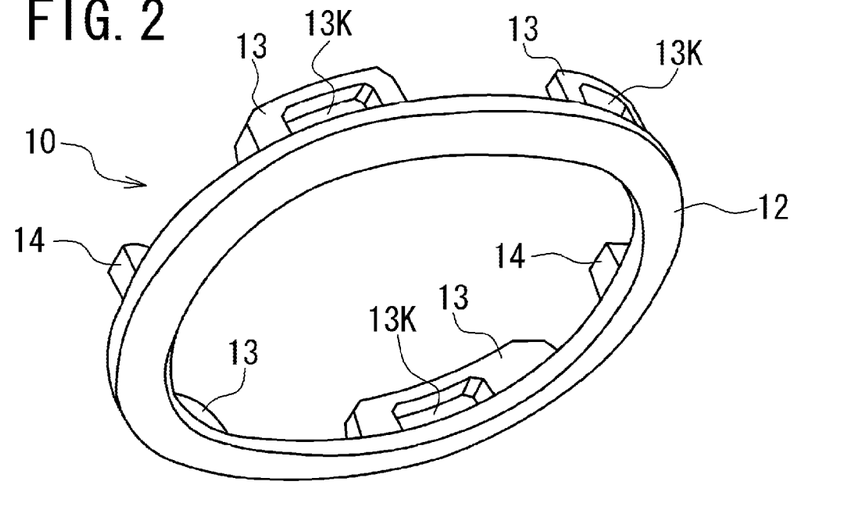
FIG. 2 is a perspective view of an ornament ring extracted from a decorative member viewed from the front face according to an embodiment of the present invention.

FIG. 2 is a perspective view of the ornament ring 12 extracted from the decorative member 10 viewed from the front face.

The decorative member 10 has predetermined numbers of engaging projections 13 and locking members 14 (herein, four and two, respectively) projecting toward the back face side in the same direction on the contact surface facing the airbag cover 1 (surface located on backward side on the plane of paper) along the rim of the annular ornament ring 12, as shown in the drawing. The engaging projections 13 and the locking members 14 are formed to have a length such that each of them is inserted into a corresponding through-hole provided on the airbag cover 1 to project from the back face thereof. The shape of the engaging projection 13 and the locking member 14 are different from each other and the locking member 14 is formed in a protrusion shape.

Meanwhile, each engaging projection 13 is a relatively large, substantially rectangular plate projection piece disposed along the rim of the ornament ring 12 and has a substantially rectangular engaging hole 13K penetrating engaging projection 13 from the inner surface to the outer surface. The engaging hole 13K is provided substantially in the center of engaging projection 13 from the base end at the ornament ring 12 side to a position in the vicinity of the protrusion end disposed on the back face of the airbag cover 1. As described above, each engaging projection 13 has the engaging hole 13K at least on the back face side of the airbag cover 1, and is held to the airbag cover 1 on the back face side of the airbag cover 1 with the engaging hole 13K without dropping off. The decorative member 10 having the ornament ring 12 and the attachment of the decorative member 10 to the airbag ring 1 are described below, where the ornament 11, the ornament ring 12, and their configurations are collectively referred to as the decorative member 10.

Figure 3A:
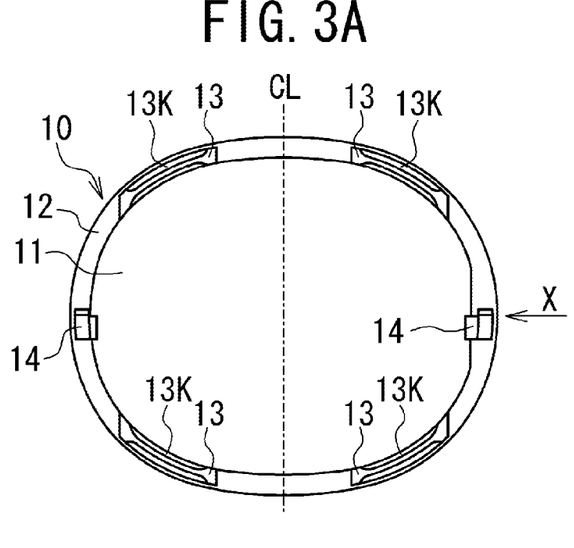
FIG. 3 is a schematic view of a decorative member according to an embodiment of the present invention.
Figure 3B:
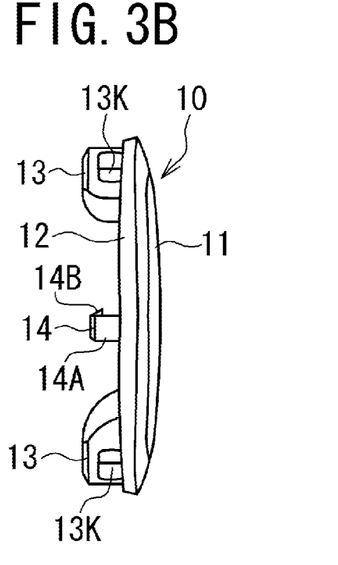

FIG. 3 is a schematic view of the decorative member 10 according to an embodiment of the present invention, wherein FIG. 3A is a plan view of the back face of the decorative member 10 and FIG. 3B is a side view of the decorative member 10 taken from the direction of the arrow X in FIG. 3A.

The decorative member 10 has at least two engaging projections 13 facing each other across an intermediate position therebetween, in a manner that the respective engaging holes 13K are directed to the intermediate position and the openings thereof face each other. In this embodiment as shown in FIG. 3A, the decorative member 10 has a pair of engaging projections 13 facing each other on the two sides of the centerline CL, where the engaging projections 13 having the inner surface facing each other and the engaging holes 13K directed to the same side are disposed along the upper and lower rims. As described above, the decorative member 10 has at least a pair of engaging projections 13 facing each other. Herein, two pairs (a total of four) of engaging projections 13 are substantially symmetrically arranged on the both sides of the centerline CL along the rim of the decorative member 10 at a distance.

The decorative member 10 also has one or more locking members 14 at predetermined positions between the engaging projections 13. Herein, one locking member 14 is arranged on each side rim of the decorative member 10 (in the central position of the rim in FIG. 3A), and two locking members 14 in total are substantially symmetrically arranged on the most distant lateral positions along the rim of the decorative member 10. The locking member 14 is a means for locking the decorative member 10 to the airbag cover 1 by detachable lock to a locking part of the airbag cover 1 under the condition that the engaging projections 13 extend through the through-holes of the airbag cover 1. Accordingly, the locking member 14 is locked to the airbag cover 1 when the engaging projections 13 pass through the through-holes.

Figure 4:
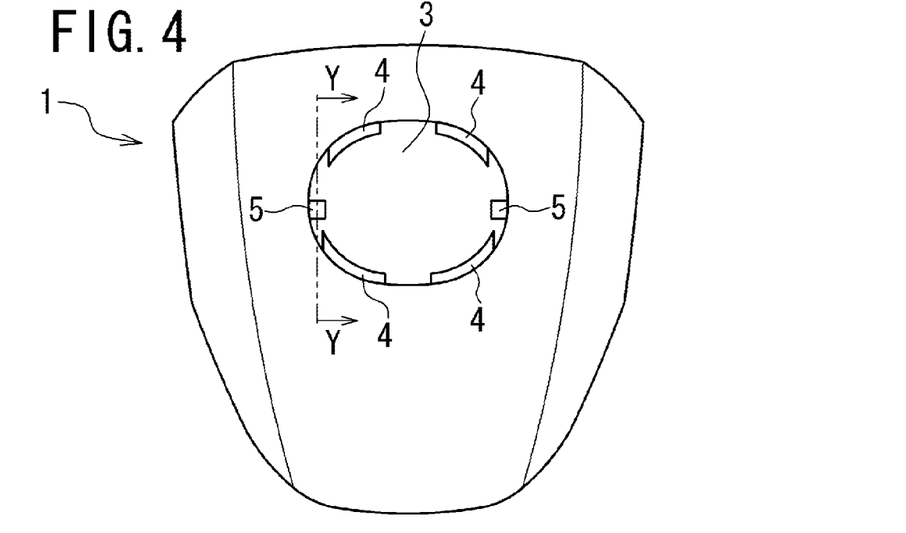
FIG. 4 is a front view of an airbag cover from which a decorative member is removed.
Figure 5:
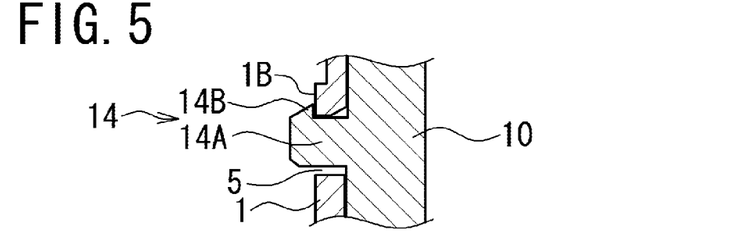
FIG. 5 is a cross-sectional view taken along line Y-Y of FIG. 4 and schematically illustrating a locking member of the decorative member locked to an airbag cover.

FIG. 4 is a front view of the airbag cover 1 from which the decorative member 10 is removed, schematically showing its shape viewed from the front face. FIG. 5 is a cross-sectional view taken along line Y-Y of FIG. 4 schematically illustrating the locking member 14 of the decorative member 10 with the airbag cover 1.

The airbag cover 1 has an attaching part 3 for fitting the decorative member 10 thereinto formed on the front face of the airbag cover 1 as shown in FIG. 4. The attaching part 3 has a concave shape for housing and mounting the entire decorative member 10 having a specific thickness and contour. Through-holes 4 and locking holes 5, that are the locking parts as above described, are formed along the rim, on the bottom of the attaching part 3 corresponding to the engaging projections 13 and the locking members 14 of the decorative member 10. The through-holes 4 and the locking holes 5 each have a shape fitting to the engaging projections 13 and the locking members 14 respectively, and penetrate from the front face to the back face so that the engaging projections 13 and locking members 14 pass therethrough.

The decorative member 10 is fit to the attaching part 3 such that the back face faces the airbag cover 1, and the engaging projections 13 and the locking members 14 are inserted to the respective through-holes 4 and locking holes 5 from the front face of the airbag cover 1 to the back face. Thus, the decorative member 10 is held inside the attaching part 3. In this state, the decorative member 10 is tentatively retained and held inside the attaching part 3 by locking the two locking members 14, at the circumference of the locking holes 5 of the airbag cover 1 as shown in FIG. 5. Herein, the locking member 14 has a protrusion 14A formed to be protruded from the back face of the decorative member 10 so as to be inserted to the locking holes 5 and an integrally formed locking claw (hook) 14B projecting crosswise at the protrusion end. The locking claw 14B is caught on the back face 1B of the airbag cover 1 and locked to the back face 1B. Each engaging projection 13 of the decorative member 10 also projects from the back face 1B of the airbag cover 1, and at least a part of each engaging hole 13K is located inside the airbag cover 1 to be engaged and held by a holding member on the back face 1B of the airbag cover 1.

Figure 6:
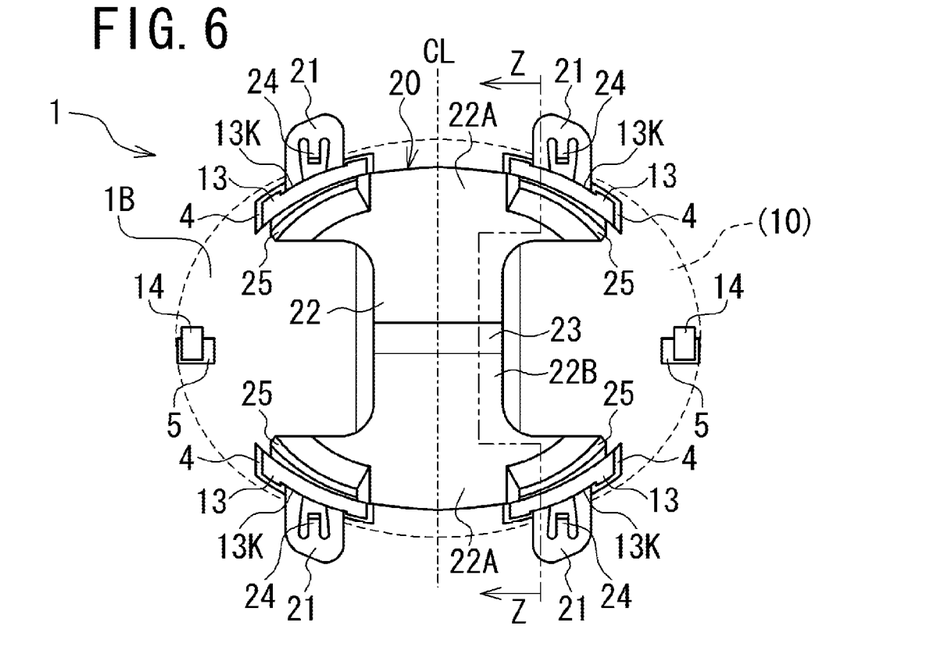
FIG. 6 is a schematic view of a decorative member held to an airbag cover by a holding member.
Figure 7:
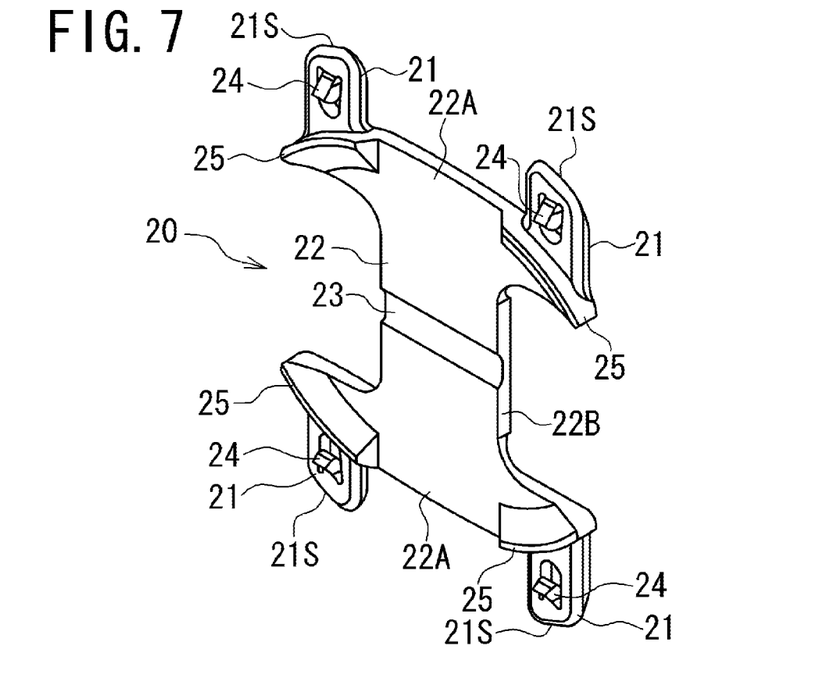
FIG. 7 is a perspective view schematically illustrating a holding member.

FIG. 6 is a schematic plane view of the relevant part of the decorative member 10 held to the airbag cover 1 by the holding member 20 viewed from the back face 1B of the decorative member 10. FIG. 7 is a perspective view schematically illustrating the holding member 20 viewed from the back face 1B.

The holding member 20 has engaging sections 21 to be inserted into the engaging holes 13K of the engaging projections 13 of the decorative member 10 on the back face 1B side of the airbag cover 1 and a connecting part 22 linking the engaging sections 21 to each other.

The engaging section 21 is passed through the engaging hole 13K and disposed between the inner surface adjacent to the protrusion end of the engaging projection 13 and the back face 1B of the airbag cover 1. The engaging section 21 engages with the engaging projection 13 to function as a member that prevents dropping off the through-hole 4 and a movement (displacement), and as an attaching member (attaching section) to the airbag cover 1. The engaging sections 21, which are integrally formed with the connecting part 22, in opposite directions each other or in radial directions depending on the locations and shape of the engaging projections 13 of the decorative member 10, and are directed toward the respective engaging holes 13K of the engaging projections 13. Herein, a pair of engaging sections 21 in the opposite direction to each other are disposed on both sides, respectively, of the centerline CL, corresponding to the arrangement of the four engaging projections 13. A pair of the engaging sections having a predetermined length are formed toward the opposite direction to each other (upward and downward direction in the drawing). Consequently, the holding member 20 has the engaging sections 21 at four corners, two engaging sections being directed upward on the upper rim and the other two engaging sections being directed downward on the lower rim.

Meanwhile, the connecting part 22 includes two wide end parts 22A adjacent to the upper and lower engaging sections 21 and an intermediate part 22B between the end parts 22A. The end parts 22A has a width corresponding to the interval between the upper or lower engaging sections 21, and connects the engaging sections 21. The intermediate part 22B has a relatively narrow width, and connects the end parts 22A. Consequently, the connecting part 22 in its entirety is substantially laterally-facing H-shape and symmetrical with respect to the centerline CL and the crossed centerline.

In the holding member 20, mainly, the connecting part 22 can be deformed such that the engaging sections 21 to be engaged with the opposed engaging projections 13 approach to or separate from each other (upward and downward direction in FIG. 6). Through the deformation, the engaging sections 21 are inserted to the engaging holes 13K of the engaging projections 13. The holding member 20 also has a thin part (groove) 23 having a smaller thickness compared to the other parts, across the center of the connecting part 22. Since the thin part 23 has relatively low rigidity to deformation, the connecting part 22 is bent at the thin part 23 by elastic deformation or plastic deformation (elastic deformation in this embodiment). As described above, the holding member 20 has a bending part that is disposed between the engaging sections 21. The bending part is bent to deform so that the engaging sections 21 approach to or separate from each other. The engaging sections 21 are inserted to the respective engaging holes 13K with the restoration of the holding member 20 from the bent shape.

Figure 8A:
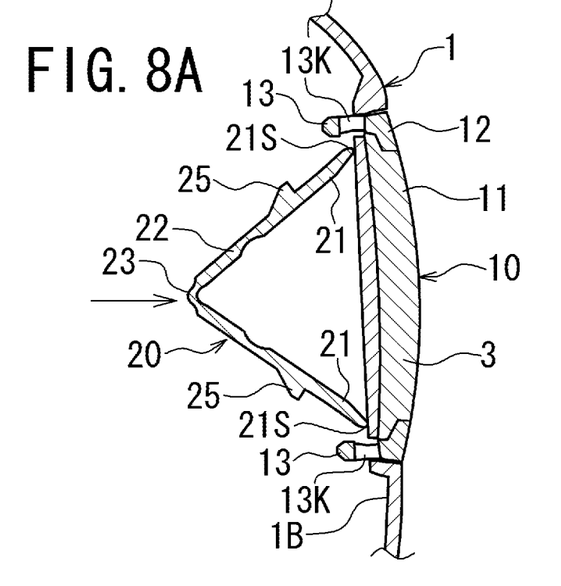
FIG. 8 is a schematic view illustrating procedures for inserting engaging sections of a holding member into engaging holes.
Figure 8B:
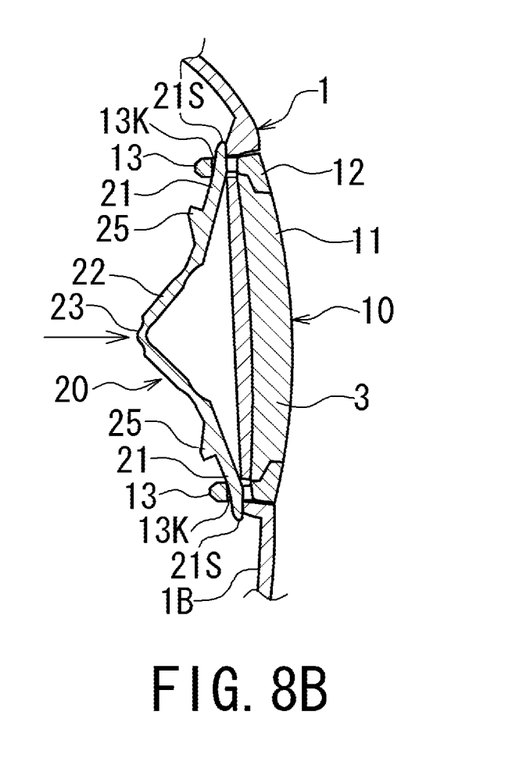
Figure 8C:
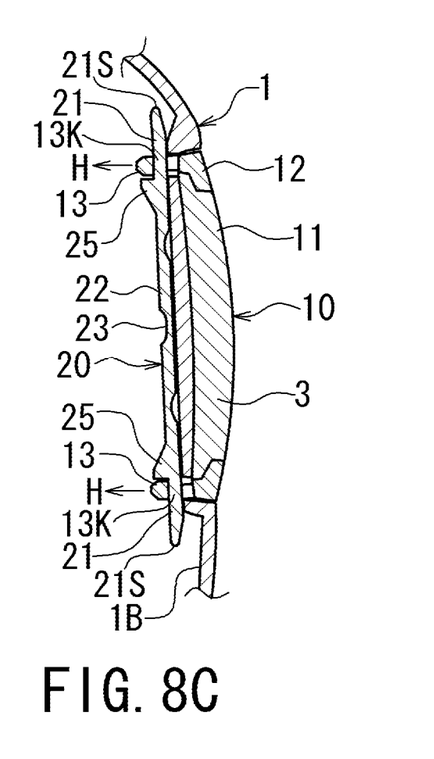

FIG. 8 is a schematic view illustrating procedures for insertion of engaging sections 21 of the holding member 20 into the engaging holes 13K. The insertion procedures are shown in sequence in cross-sectional views taken along line Z-Z in FIG. 6.

For insertion, the connecting part 22 is bent at the thin part 23 (refer to FIG. 8A) by elastic deformation, the engaging sections 21 are directed to the airbag cover 1, and the holding member 20 is bent double substantially at the center. On this occasion, engaging sections 21 are displaced along the line connecting the opposing engaging projections 13 and are approached to each other so as to be disposed between the engaging projections 13. Subsequently, while the bending part of the holding member 20 is pressed against the airbag cover 1, the connecting part 22 is deformed such that the engaging sections 21 separate from each other (upward and downward direction in the drawing), so that the connecting part 22 is gradually restored to the original straight cross-sectional shape. Accordingly, engaging sections 21 (refer to FIG. 8B) are displaced toward the respective engaging projections 13, in the opposite direction in the drawing, and the engaging sections 21 of the holding member 20 are inserted to the respective engaging holes 13K. Subsequently, the connecting part 22 is restored from the bent shape (refer to FIG. 8C) so that the engaging sections 21 are inserted into the respective engaging holes 13K to end portions of the connecting part 22. Thus, the engaging sections 21 engage the engaging holes 13K.

As described above, the holding member 20 is deformed from a state where the engaging sections 21 are approached to each other, to the direction in which the engaging sections 21 separate from each other. With this movement, the engaging sections 21 are inserted to the respective engaging holes 13K and are engaged with the respective engaging projections 13 on the back face 1B side of the airbag cover 1. Accordingly, the engaging projections 13 are fixed to the through-holes 4, so that the decorative member 10 is held to the attaching part 3 of the airbag cover 1. Thus, the decorative member 10 is firmly attached to the airbag cover 1, and maintained in the same state.

In the embodiment, the holding member 20 is integrally formed from an elastically deformable material such as synthetic resin that can be relatively readily bent and restored, and the entire holding member 20 including the engaging sections 21 is deformed during the inserting work described above. In the holding member 20, the tip 21S side of the engaging section 21 to be inserted into the engaging hole 13K is tapered (wedge-shaped) and has a thickness gradually decreasing toward the tip 21S, so that the tip 21S can be readily inserted to the engaging hole 13K. Note that, herein, the surface facing the airbag cover 1 of the engaging section 21 is formed inclined surface (tapered surface), so that the thickness gradually increases from the tip 21S toward the base end.

In the holding member 20, the engaging section 21 inserted to the engaging hole 13K is held between the wall (an inner surface of the engaging hole 13K side) adjacent to the protrusion end across the engaging hole 13K of the engaging projection 13 and the back face 1B of the airbag cover 1 across the engaging projection 13. Namely, even in the state that the engaging projection 13 passes through the airbag cover 1, the entirety of the engaging hole 13K is not disposed on the back face of the airbag cover 1, but a part of the engaging hole 13K is located in the through-hole 4. At least a part of the engaging section 21 engaging with the engaging projection 13 has a larger thickness to some extent than the gap between the wall adjacent to the protrusion end of the engaging projection 13 and the back face 1B of the airbag cover 1. After the engaging section 21 is inserted into the engaging hole 13K in this state, the front and back faces of the engaging section 21 come into contact with the back face 1B of the airbag cover 1 and the inner surface adjacent to the protrusion end of the engaging projection 13, respectively. Consequently, a force acts on the protrusion end of the engaging projection 13 in the direction so as to recede from the airbag cover 1 (arrow H in FIG. 8C). As a result, the engaging section 21 is held as described above to be firmly engaged and fixed, and the decorative member 10 is pressed against the airbag cover 1 to achieve secure and robust attachment.

Furthermore, the holding member 20 (refer to FIGS. 6 and 7) has stopper 24, which prevent the inserted engaging section 21 from dropping off the engaging hole 13K and maintain the engagement with the engaging projection 13, at the tip 21S side of the engaging section 21. The stopper 24 is a contact member to contact with the engaging projection 13 around the engaging hole 13K, and is integrally formed with the engaging section 21 having a protrusion on one side (herein, the back face) of the engaging section 21 and being able to be displaced on the other side. The engaging section 21 with the stopper 24 is inserted to the engaging hole 13K. After the insertion, the stopper 24 passing through the engaging hole 13K is disposed between the engaging projection 13 and the tip 21S of the engaging section 21. In the event that the engaging section 21 is displaced in the direction for pulling out of the engaging hole 13K, the stopper 24 comes into contact with the engaging projection 13 to prevent the engaging section 21 from dropping off.

In addition, the holding member 20 (refer to FIGS. 6 and 8C) has thick parts 25 facing respective engaging projections 13 in order to protect the engaging projections 13. The thick part 25 is disposed on the connecting part 22 adjacent to the engaging section 21, adjoins or is in close proximity to the protrusion end of the engaging projection 13 across the engaging hole 13K, and faces the substantially entirety of the engaging projection 13 in accordance with the shape and length of engaging projection 13. Herein, at least a part of the thick part 25 adjacent to the engaging projection 13 is flush with the protrusion end of the engaging projection 13 in the vicinity of the boundary between the engaging section 21 and the holding member 20 (end 22A). Furthermore, the thick part 25 is tapered, that is, the thickness gradually increases from a predefined position close to the engaging projection 13 toward the engaging projection 13.

As described above, in the airbag cover 1 of the airbag device in the embodiment, the holding member 20 is deformed from a state where the engage sections 21 are approached to each other to the direction in which the engaging sections 21 separate from each other. The engaging sections 21 are thereby inserted to the respective engaging holes 13K to be engaged with the engaging projections 13. Consequently, the decorative member 10 is attached and held to the airbag cover 1. Since the shape of the holding member 20 is not limited to a conventional annular or discal shape, various deformable shapes, such as rectangular and elongated shapes extending in the direction of deformation, may be available and the size of the holding member 20 may be relatively small. In parallel, the space for the disposition and the engagement work of the holding member 20 can be saved by being slender, and the degree of freedom of the design versatility in the shape and disposition is increased. Therefore, the shape of the decorative member 10 having the facing engaging projections 13 is not limited to a circle. Since an ellipsoidal or rectangular decorative member 10 can also be formed, the degree of freedom of the design is significantly increased.

Since the engaging section 21 is readily inserted to the engaging hole 13K without a special jig for attaching the decorative member 10, the workability is enhanced in the holding member 20. During attachment work, the decorative member 10 is not required to be strongly pressed against the airbag cover 1 and no rotational force acts on the decorative member 10. Consequently, the front face of the decorative member 10 and the back face (contact surface) of the airbag cover 1 are protected from damages such as chips and flaws. In addition, herein, since the engaging work is readily performed by pressing the bending part of the holding member 20 toward the airbag cover 1, the decorative member 10 is attached more easily.

Furthermore, the shape of the attached holding member 20 remains intact, unless the holding member 20 is intentionally pulled so as to separate from the airbag cover 1. Accordingly, it is possible to prevent the engaging section 21 from being subjected to a force in the direction in which the engaging section 21 is pulled out from the engaging hole 13K. As a result, it is possible to prevent the engaging section 21 from being pulled out from the engaging hole 13K and to prevent the engaging section 21 from being disengaged from the engaging hole 13K of the engaging projection 13. Thus, the decorative member 10 does not drop off the airbag cover 1 and maintains the stable attachment.

In addition, since the folded airbag is disposed on the back face 1B of the airbag cover 1, the holding member 20 is pressed against the airbag cover 1 by the airbag to prevent deformation toward the opposite direction. Accordingly, the shape of the holding member 20 is maintained. When gas is supplied to the airbag from the inflator, the airbag is inflated and deployed to fracture the airbag cover 1 while pressing the holding member 20 toward the airbag cover 1. As a result, the pressed holding member 20 maintains the state before the inflation and deployment and stays at the engaging position.

Thus, when the airbag is inflated and deployed, the holding member 20 and the decorative member 10 do not drop off the airbag cover 1.

According to the embodiment, the decorative member 10 can be readily attached to the airbag cover 1 of the airbag device, and it is possible to enhance workability of the attachment. In addition, the decorative member 10 can be securely attached and held to the airbag cover 1, and it is possible to increase the degree of freedom of the design of the shape of the decorative member 10. Furthermore, herein, since the engaging section 21 of the holding member 20 has the stopper 24 that prevents the engaging section 21 from dropping off the engaging hole 13K, the engagement section 21 is maintained to engage with the engaging projection 13 even in the case of deploying the airbag. Thus, it is possible to prevent the decorative member 10 from dropping off absolutely.

Furthermore, in the holding member 20, since the tip 21S side of the engaging section 21 is tapered and the thickness gradually decreases toward the tip 21S, the engaging section 21 is readily inserted to the engaging hole 13K. In parallel, since the engaging section 21 deforms easily to insert to the engaging hole 13K, the resistance of insertion becomes low and the engaging section 21 will hardly be caught in the engaging hole 13K. Thus, workability or working efficiency of the attachment is enhanced. The engaging section 21 of the holding member 20 inserted to the engaging hole 13K is held between the inner surface, adjacent to the protrusion end, of the engaging projection 13 and the back face 1B of the airbag cover 1. Consequently, the engaging section 21 is firmly engaged and fixed to the engaging projection 13. The decorative member 10 is pulled and pressed against the airbag cover 1 through the engaging projection 13 as described above. Thus, the decorative member 10 is firmly fixed to the airbag cover 1, and the attachment is robustly maintained. This does not cause shift or abnormal noise due to loose attachment of the decorative member 10 to the airbag cover 1.

In the embodiment, the holding member 20 has a thick part 25 adjacent to the protrusion end of the engaging projection 13. In the case where a member on the back face 1B of the airbag cover 1 comes into contact with the holding member 20, the member does not come into contact with the engaging projection 13 or can reduce the force acting on the engaging projection 13. In addition, in the case where a member in contact with the holding member 20 slides or moves toward the engaging projection 13, the thick part 25 blocks the member or diverts it in another direction so as to prevent it from catching in the engaging projection 13. Consequently, catching the inflating and deploying airbag in the engaging projection 13 is prevented, and therefore occurrence of damage in the engaging projection 13 is suppressed.

Because the thick part 25 gradually increases its thickness toward the engaging projection 13, a member adjacent to the back face 1B of the airbag cover 1 is displaced smoothly along the inclined surface of the thick part 25 and diverted from the engaging projection 13. Consequently, it is possible to reduce the impact to the thick part 25 or the engaging projection 13. In parallel, since rigidity of the thick part 25 is high in the vicinity of the engaging projection 13 and gradually decreases toward the other side, the rigidity of the holding member 20 in the vicinity of the thick part 25 is not excessively high. Accordingly, the engaging section 21 can be readily inserted to the engaging hole 13K while keeping the deformation in the vicinity.

Furthermore, since the decorative member 10 has locking members 14 detachably locking with the locking part of the airbag cover 1, the decorative member 10 can be tentatively retained to the airbag cover 1 during the attachment work of the decorative member 10. Accordingly, the decorative member 10 is readily attached to the airbag cover 1 by the holding member 20 without strongly pressing or touching the decorated surface of the decorative member 10. This enhances attaching workability without damage or dirt of the decorative member 10. Even if the deformation force acts to the airbag cover 1 during inflation and deployment of the airbag, a part of the decorative member 10 excluding the positions where the engaging projections 13 are formed is pressed to prevent the decorative member 10 from being lifted off the airbag cover 1. Thus, the decorative member 10 is held inside the attaching part 3.

Alternatively, during attachment of the decorative member 10, the holding member 20 can also be elastically deformable in other embodiments instead of bending. That is, for example, the connection part 22 between the engaging sections 21 may be deformed by compression or expansion. With this elastic deformation, the engaging sections 21 is restored from approach state to separate state so as to be inserted to the engaging holes 13K. Alternatively, the holding member 20 may be subjected to plastic deformation, for example, from the bent shape (refer to FIG. 8) to a straight shape so that the engaging sections 21 is engaged with the respective engaging projections 13 of the decorative member 10; or a bent holding member 20 of thermoplastic resin may be deformed into a straight shape by heat. Alternatively, the holding member 20 may has a connecting part 22 having a hinge or a rotating mechanism at the center through which the facing engaging sections 21 are mechanically deformed so as to approach to or separate from each other. Note that, elastic deformation of the holding member 20 facilitates attachment of the decorative member 10 due to restoring force acting on the holding member 20 and stabilizes the engaged state due to maintaining the attached shape of the holding member 20. Consequently, it is possible to more assuredly prevent the decorative member 10 from dropping off.

Alternatively, the decorative member 10 may have three or more facing engaging projections 13 along the rim. In this case, the holding member 20 has a plurality of engaging sections 21 in a radial arrangement for the respective engaging projections 13. The holding member 20 is deformed, so that the engaging sections 21 are radially displaced from their close state to separate state to be inserted to the engaging holes 13K of the respective engaging projections 13. As described above, two or more engaging projections 13 of the decorative member 10 and engaging sections 21 of the holding member 20 are provided in a facing manner so as to be inserted and engaged each other, and also two or more pairs of them can be provided.

REFERENCE SIGNS LIST

1: airbag cover 2: wall 3: attaching part 4: through hole 5: locking hole 10: decorating member 11: ornament 12: ornament ring 13: engaging projection 13K: engaging hole 14: locking member 20: holding member 21: engaging section 22: connecting part 23: thin part 24: stopper 25: thick part

What is claimed is:

1. An airbag cover having a decorative member, wherein the decorative member has at least two engaging projections facing each other on the airbag cover side and passing through through-holes in the airbag cover so as to project from the back face of the airbag cover and engaging holes, each hole disposed in a respective engaging projection that extends past the back face side of the airbag cover;

the airbag cover comprises a holding member that has engaging sections engaged with the engaging projections by insertion into the engaging holes on the back face side of the airbag cover and holds the decorative member to the airbag cover by engagement of the engaging sections with engaging projections; and the holding member is deformed from a state where the engaging sections are approached to each other so as to separate the engaging sections to be inserted to the respective engaging holes.

2. The airbag cover according to claim 1, wherein the holding member is restored by elastic deformation from a state where the engaging sections are approached to each other so as to separate the engaging sections.

3. The airbag cover according to claim 1, wherein the holding member comprises a bending part disposed between the engaging sections for enabling the engaging sections to approach to and separate from each other by bending deformation.

4. The airbag cover according to claim 1, wherein the engaging section of the holding member comprises a stopper preventing dropping off the engaging hole.

5. The airbag cover according to claim 1, wherein the engaging section of the holding member inserted to the engaging hole is held between an inner surface adjacent to the protrusion end of the engaging projection and the back face of the airbag cover.

6. The airbag cover according to claim 1, wherein a tip side of the engaging section to be inserted to the engaging hole is tapered and has a thickness gradually decreasing toward the tip.

7. The airbag cover according to claim 1, wherein the decorative member comprises a locking member detachably locked to a locking part of the airbag cover under the condition that the engaging projections extend through the through-holes of the airbag cover.

8. The airbag cover according to claim 1, wherein the holding member comprises thick part adjoining the engaging section inserted in the engaging hole, adjacent to the protrusion end across the engaging hole of the engaging projection.

9. The airbag cover according to claim 8, wherein the thickness of the thick part of the holding member gradually increases toward the engaging projection.

10. An airbag device comprising the airbag cover according to claim 1.

* * * * *